United States Patent [19]
Khandkar et al.

[11] Patent Number: 5,298,341
[45] Date of Patent: Mar. 29, 1994

[54] MULTIPLE STACK ION CONDUCTING DEVICES

[75] Inventors: Ashok C. Khandkar, Salt Lake City; Singaravelu Elangovan, Sandy; Joseph J. Hartvigsen, Kaysville, all of Utah

[73] Assignee: Cerramatec, Inc., Salt Lake City, Utah

[21] Appl. No.: 932,962

[22] Filed: Aug. 20, 1992

[51] Int. Cl.$^5$ .................. H01M 8/24; B01D 13/08
[52] U.S. Cl. ........................................ 429/32; 96/4
[58] Field of Search ................. 429/32; 55/158; 96/4

[56] References Cited

U.S. PATENT DOCUMENTS

| | | | |
|---|---|---|---|
| 4,254,086 | 3/1981 | Sanders | 55/158 X |
| 4,496,373 | 1/1985 | Behr et al. | 55/158 X |
| 4,750,918 | 6/1988 | Sirkar | 55/158 X |
| 5,186,806 | 2/1993 | Clark et al. | 429/32 X |
| 5,188,910 | 2/1993 | Ishihara et al. | 429/32 X |

Primary Examiner—Marianne M. Cintins
Assistant Examiner—Michael B. Hydorn
Attorney, Agent, or Firm—Trask, Britt & Rossa

[57] ABSTRACT

A modular arrangement for stacks of ion conducting electrolyte elements includes a plurality of solid state ion conducting electrolyte elements spaced apart and arranged into stacks and the stacks further arranged at regular intervals around a central plenum. A plurality of gas flow passageways are disposed in the spaces between the electrolyte elements to enable reactant gases to circulate between the elements. A pair of manifold plates are disposed on either side of the electrolyte elements and sandwich the elements therebetween.

19 Claims, 4 Drawing Sheets

MULTIPLE STACK ION CONDUCTING DEVICES

BACKGROUND OF THE INVENTION

1. Field

This application relates to arrangements and manifolds for stacks of solid state ion conducting electrolyte elements, and more particularly to arrangements and manifolds for assembling modular multiple stack ion conducting devices.

2. State of the Art

Solid state ion conducting devices are typically constructed from a plurality of electrolyte elements which are capable of conducting ions of a specific size or type through the element. Materials having this capability include ceramic metal oxides such as bismuth oxide and cerium oxide, polymeric electrolyte membranes, and immobilized molten electrolyte membranes. The membranes are more pliant than the metal oxides, but function in a similar manner. Zeolyte membranes having pore sizes allowing diffusion of certain sized molecules across the membrane are also for specific ion conduction. Each type of metal oxide or membrane electrolyte finds use in a different ion conducting application.

The electrolyte elements are often formed as flat plates having an electrically conductive electrode material attached to a portion of one or both of the plate's flat surfaces. When the electrode covered electrolyte plates are exposed to a gas containing the uncharged form of the ionic species, an electrochemical reaction occurs between the electrode and the uncharged species to generate the specific ions.

Ion conducting capacity can be increased by arranging a plurality of electrolyte plates into a stack whereby each plate is separated from successive plates by electrically conductive spacers or interconnectors. The spacers allow reactant gases necessary for ion conducting activity to flow between the electrolyte plates, and come in contact with the electrode covered surfaces. The spacers may be grooved interconnectors as well known in the art, or a variety of other configurations offering particular advantages in certain applications. Grooved interconnectors typically have two grooved or channeled faces on opposing sides of the interconnector, with the grooves on one side being offset 90° from those on the other. Other configurations for the spacers include internally manifolded interconnectors, and spacer bars or elements disposed between the ion conducting plates.

Ion conducting electrolytes, particularly metal oxide plates, find use in a variety of devices including fuel cells, steam electrolyzers, oxygen concentrators, and other types of electrochemical reactors. When used as a fuel cell, fuel gases such as $H_2$, $CH_4$ containing gases, synfuels, or light hydrocarbon fuel stocks, are directed to one face of the spaced apart electrolyte plates, and air is directed to the opposing face of the plates. When used as an oxygen concentrator, air is directed to one face of the plates, and pure molecular oxygen is collected from the other face. Other ion conducting devices using ion conducting electrolytes function in a similar manner, but may have structural modifications and different reactant gas requirements.

In a fuel cell, gases flowing between spaced apart electrolyte plates come in contact with, and react at, the electrode material attached to the surface of the plates. For example, at the electrode surface, an electrochemical reaction occurs in which an ionic species, such as $O^{-2}$ from air, is produced and conducted across the plate to form water and $CO_2$ on the opposite side. In the case of a typical fuel cell, this chemical reaction may be illustrated by the following equations:

air side:

$$8e^- + 2O_2 \rightarrow 4O^{-2}$$

fuel side:

$$CH_4 + 4O^{-2} \rightarrow CO_2 + 2H_2O + 8e^-$$

If the two electrodes on opposite sides of the plate are electrically connected, an electrical current may be obtained through passage of electrons between the two electrode surfaces. This reaction occurs when the plates reach an operating temperature, typically 600°–1000° C. for ceramic oxide based fuel cells, and lower for polymer and molten electrolyte membranes. Energy released from the electrochemical reactions contributes to maintaining the operating temperature. Conduction of the $O^{-2}$ ions through the electrolyte plates occurs due to a difference in the partial pressure of $O_2$ on opposite sides of the plates. In current based devices, an electrical potential applied across the plates can be used to drive the reaction.

Fuel gases and air are typically supplied to an ion conducting electrolyte stack by a manifold. A gas supply manifold may be attached to the side of the stack so that reactant gases are directed between the spaced apart electrolyte plates. Similarly, a gas collection manifold may be attached to the stack to collect gases produced during operation of the stack.

An increase in the output from an ion conducting device can be obtained by arranging several stacks together and electrically connecting the stacks in series or parallel. Parallel connection enables the device to continue functioning if one of the stacks fails, while series connection provides other advantages such as increased voltage output from fuel cells. Each stack must have access to reactant gases which necessitates use of a manifold. If the stacks are arranged in a block configuration whereby the stacks are positioned adjacent to each other, a manifold can be attached over all similarly oriented gas flow channels through the stacks. However this arrangement is subject to several problems. The flow of gases between the electrolyte plates becomes restricted as stacks are added to the assembly, resulting in inefficient cooling in the downstream stacks. Additionally, the downstream stacks may receive fuel which has been partially depleted of a reactive species. The close packing of the stacks, and reduced fuel and air flow also interferes with maintaining the assembly at a uniform temperature, further reducing the efficiency of the device. Additional stacks cannot be added to this type of manifold and stack arrangement without considerable difficulty, and construction of a new manifold.

Another option for supplying and collecting gases to and from the stacks is to manifold each stack individually. This option allows the stacks to be arranged in a pattern which facilitates uniform heating and gas flow, but makes for a bulky and difficult-to-manufacture device. The increased number of manifold seals also increases the probability of a leak occurring between the manifold and the stack. If a leak occurs in a fuel gas manifold, the fuel becomes diluted with air which severely reduces its potential to participate in the chemical reaction on the fuel side of the electrolyte plates.

Existing arrangements for the stacks of ion conducting electrolyte elements in solid state ion conducting devices also suffer from problems with oxidation of electrical pathway components. Because the electrical components are frequently exposed to the oxidizing environment of air, inexpensive electron conducting materials, such as nickel, cannot be used due to their propensity toward oxidation. This necessitates the use of expensive materials such as silver or platinum to avoid oxidation resulting in premature failure of the electrical pathway components.

DEFINITIONS

The following definitions apply to the terms used throughout the application:

An ion conducting electrolyte element is a plate or membrane constructed from a material capable of conducting a specific species or size of ion through the plate or membrane, and may include an electrically conductive electrode material attached to at least one facial surface of the element.

A stack is plurality of electrolyte elements arranged side-by-side, or one above the other, each element being spaced apart from adjacent elements by a plurality of spacers or interconnectors inserted between successive elements, and bonded together into a rigid unit.

A module is a structure containing a plurality of stacks, and can be combined and placed in register with other modules.

A modular assembly is a plurality of modules juxtaposed in registered alignment. A modular assembly is typically bonded together into a rigid unit. Each module layer of a modular assembly is referred to as a tier.

SUMMARY OF THE INVENTION

The instant invention is an arrangement for the manifold and stacks of ion conducting electrolyte elements in an ion conducting device which obviates many of the deficiencies associated with existing arrangements. The arrangement is compact, yet provides adequate gas flows through the spaced apart electrolyte elements to provide ample reactant gases to the elements. The gas flow characteristics provide excellent operating efficiency, and assist in maintaining uniform operating temperatures. The arrangement is modular, allowing ion conducting capacity to be adjusted to the requirements of a particular application by addition of ion conducting modules to form a modular assembly of the desired size.

The stacks of electrolyte elements included in each module are arranged at regular intervals in a generally radial pattern around a central plenum. Each stack is oriented so its electrolyte elements are on edge, and generally planar and parallel, each stack having about the same relative radial position and orientation to a longitudinal axis through the central plenum. With the electrolyte elements arranged on edge, a plurality of longitudinal gas flow passageways between the spaced apart elements are generally parallel with the longitudinal axis of the central plenum, while a plurality of transverse gas flow passageways are generally perpendicular to, and generally radiating from the central plenum.

A pair of generally circular manifold plates having a plurality of gas flow apertures and a plenum aperture therethrough are positioned and attached above and below the radially arranged stacks of each module. When a plurality of modules are combined into a modular assembly, a generally circular manifold plate separates each tier of modules. The manifold plates are bonded to the stacks such that the gas flow apertures seal around the openings to the longitudinal gas flow passageways, and the plenum apertures open into the central plenum. A plurality of gas flow passageways are formed which extend longitudinally through the gas flow apertures in the manifold plate above the stacks, through the longitudinal gas flow passageways of the stacks, and through the gas flow apertures in the manifold plate below the stacks. These passageways may be used to supply gases to, or collect gases from the electrolyte stacks of the module.

A plurality of interior and exterior seals are disposed between adjacent stacks in each module. The interior and exterior seals seal off the central plenum so that gases flowing through the plenum are constrained to flow through the transverse gas flow passageways radially disposed from the plenum instead of leaking through the joints between adjacent stacks.

The plenum apertures are disposed in a central area of the manifold plates, and are in fluid communication with the central plenum. A gas passageway is formed by this arrangement which extends through the plenum apertures into the central plenum, and then extends radially outward from the central plenum through the radially disposed transverse gas flow passageways in the module.

The stack and manifold arrangement provides for an increased power to volume ratio for an ion conducting device. Performance and reliability of the device are improved due to improved flow characteristics, and a reduction in the number of gas passageway seals. Temperature equilibrium among the individual elements in the stacks is rapidly achieved and maintained, and electrical pathways may be maintained totally within a reducing environment. This feature obviates the need to use precious metals in electrical pathways between the electrolyte elements. Fuel gas utilization is improved by directing the gas through a series of modules, and reforming the gas before it enters each module. The design of the arrangement is simple, and easier to manufacture than existing modular arrangements. Separation of gaseous products is made easier in that product gases from the stacks in each module may be collected from the central plenum. The modular capability of the arrangement also allows ion conducting devices to be constructed according the requirements of a particular application.

A further understanding of the construction and operation of the modular stack and manifold arrangement may be obtained from the following drawings and detailed description.

DETAILED DESCRIPTION OF THE ILLUSTRATED EMBODIMENTS

Figure 1:
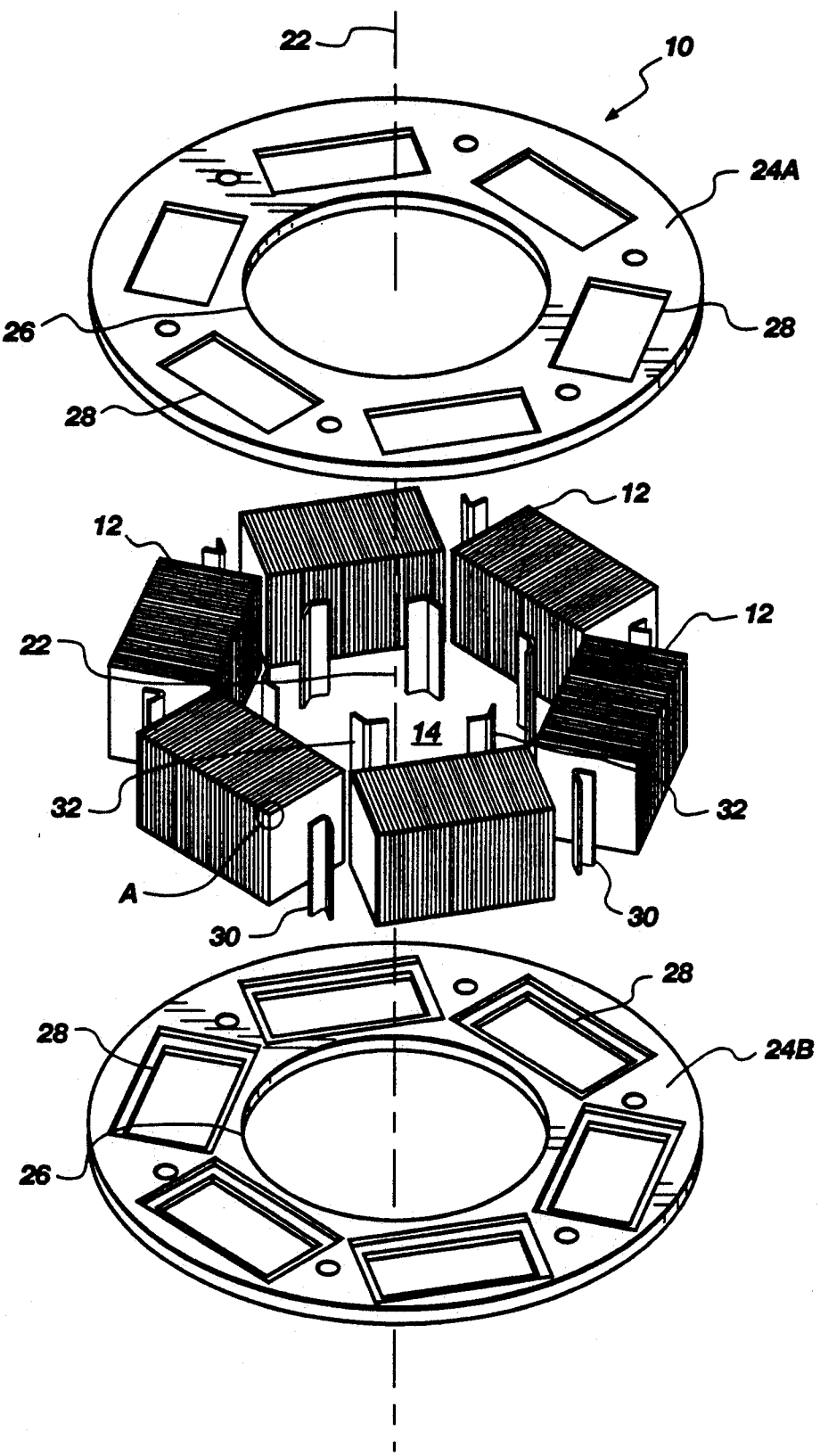
FIG. 1 is an exploded perspective view of a six stack embodiment of a module constructed according to the modular stack and manifold arrangement.

Referring to FIG. 1, a preferred embodiment of an ion conducting module 10 arranged in accordance with the instant invention includes six stacks 12 of ion conducting electrolyte elements arranged in a generally circular array around a central plenum 14. Any practical number of stacks greater than two may also be used in accordance with the requirements of a particular application.

Each of the stacks includes a plurality of flat plate ion conducting electrolyte elements. Preferred materials for the electrolyte elements are the oxides of the metals zirconia, ceria, hafnia, thoria, and bismuth, but other solid state electrolyte materials may also be used. Polymeric electrolyte membranes, and immobilized liquid or molten electrolyte membranes may be used in place of metal oxide plates. Monolithic plates having gas flow grooves cast into the surface of the plate may also be used in place of the flat metal oxide plates. A typical number of electrolyte plates per stack is 40, but other numbers of plates may be used for various applications. A typical size of the electrolyte plates is 10 cm by 10 cm, but also may be different in accordance with various applications.

Figure 2:
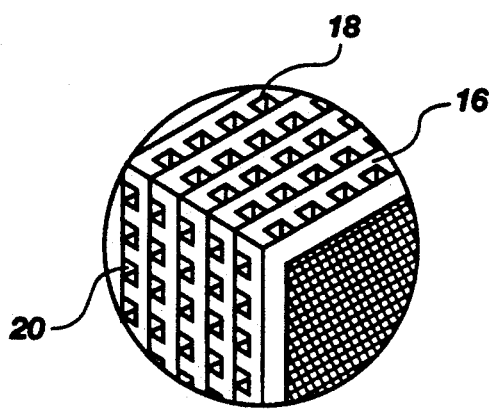
FIG. 2 is an enlarged perspective view of the circled portion of FIG. 1 labeled A illustrating the transverse and longitudinal gas flow passageways through a portion of a stack.

The stacks 12 are oriented about a central plenum 14 so the ceramic electrolyte plates are on edge and stacked side by side, rather than stacked atop one another. As best illustrated by FIG. 2, arranging the stacks on edge also arranges the spacers or stack interconnectors 16 on edge. This arrangement orients a set of longitudinal gas flow passageways 18 longitudinally and generally aligned with the longitudinal axis 22 of central plenum 14, and a set of transverse gas flow passageways 20 transverse to, and generally radiating from central plenum 14.

Referring again to FIG. 1, a pair of generally circular manifold plates 24A and 24B are positioned above and below the stacks 12. Manifold plates 24A and 24B may be constructed from ceramic materials identical or similar to the materials used for the electrolyte elements, or may be constructed from metals capable of withstanding the high operating temperature. The manifold plates 24A and 24B include a generally central plenum aperture 26, and a plurality of rectangular gas flow apertures 28. Central plenum aperture 26 is in fluid communication with central plenum 14, and the transverse gas flow passageways 20 radiating from the central plenum. Each rectangular gas flow aperture 28 is in fluid communication with a set of longitudinal gas flow passageways 18 in the stack sandwiched therebetween. If the manifold plates are constructed from metal, an electrical insulating material capable of withstanding the high operating temperature is disposed around the perimeter of the gas flow apertures 28 to prevent electrical shorting of the electrolyte elements. In an alternate embodiment, the manifold plates are a multi-piece structure which fits together to resemble the illustrated manifold plates.

Figure 3:
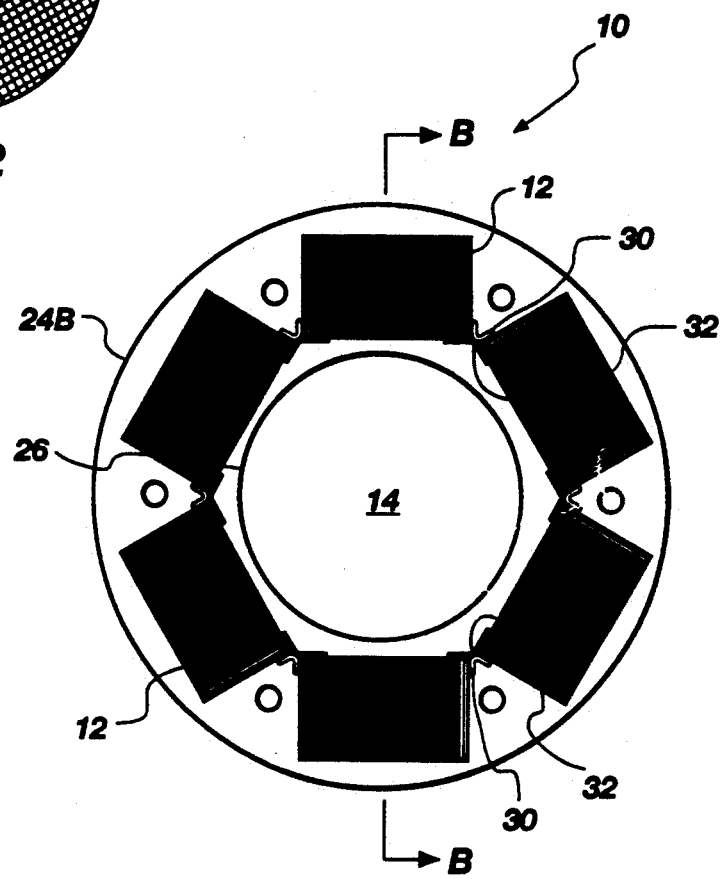
FIG. 3 is a plan view of the six stack module embodiment in FIG. 1, with the top manifold plate removed.
Figure 6:
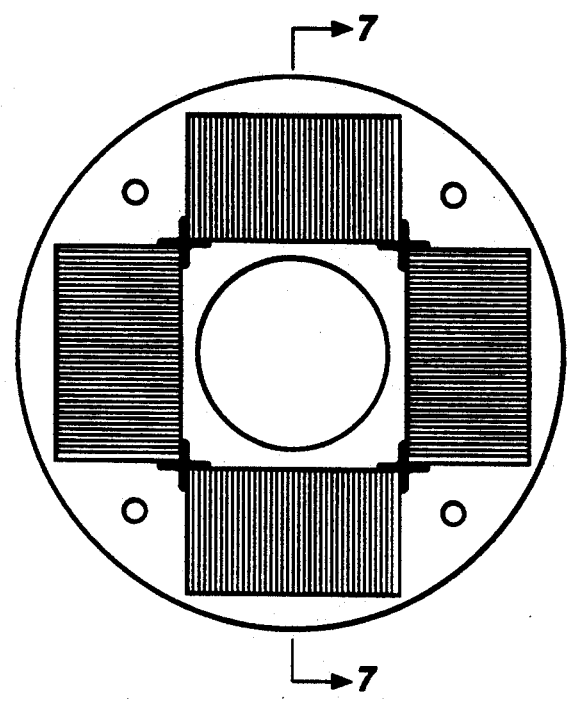
FIG. 6 is a plan view of the modular assembly in FIG. 5 with the top manifold plate removed.

As best illustrated in FIGS. 1, 3, and 6, a plurality of exterior stack seals 30 and interior stack seals 32 are disposed between adjacent stacks 12, to seal off the spaces between the stacks. The stack seals 30 and 32 may be constructed from material identical or similar to the ceramic materials used for the electrolyte elements and manifold plates, or may be constructed from high temperature resistant metal.

Figure 4:
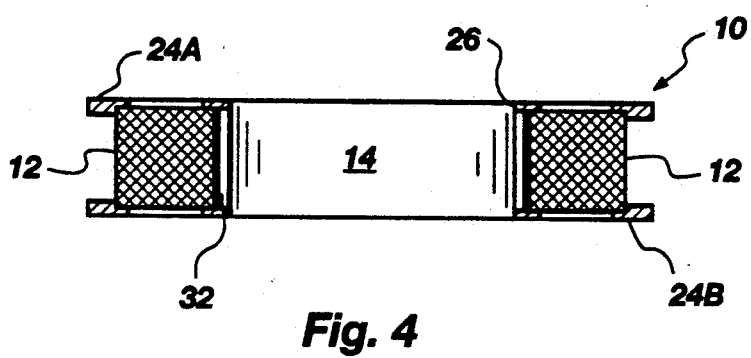
FIG. 4 is an elevation view of the section B—B in FIG. 3 but including the top manifold plate.
Figure 5:
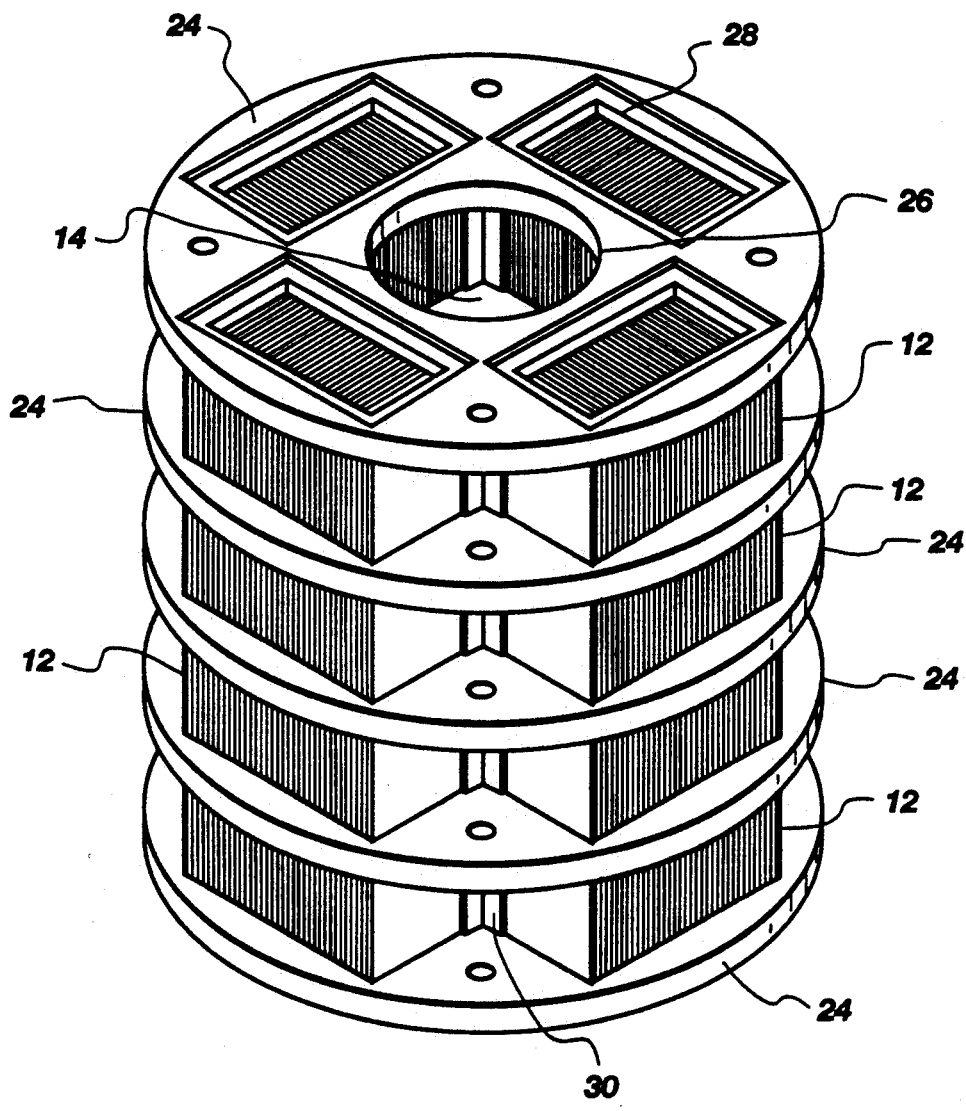
FIG. 5 is a perspective view of a plurality of four stack module embodiments assembled into a modular ion conducting assembly.

Referring to FIG. 4, the manifold plates 24A and 24B are arranged above and below the stacks 12 and interior and exterior spacers 30 and 32. When the manifold plates, spacers, and stacks are treated with a seal glass before being assembled as illustrated, the entire assembly may be bonded into a rigid module by thermally treating the assembly. Preferably, the stacks 12 are thermally treated and bonded separately before being bonded into the module. Alternately, a plurality of modules 10 may be stacked into a modular assembly as illustrated in FIG. 5, coated with a seal glass, and the entire modular assembly thermally bonded together. When assembled into the modular assembly in FIG. 5, the manifold plates in the middle of the assembly are identical with respect to the arrangement of the apertures. Certain adaptations may be made to the manifold plates on the ends of the assembly to facilitate communication of the gas apertures to gas supply sources and collection devices. Various numbers of modules 10 may be included in the modular assembly to achieve the desired level of output.

Figure 7:
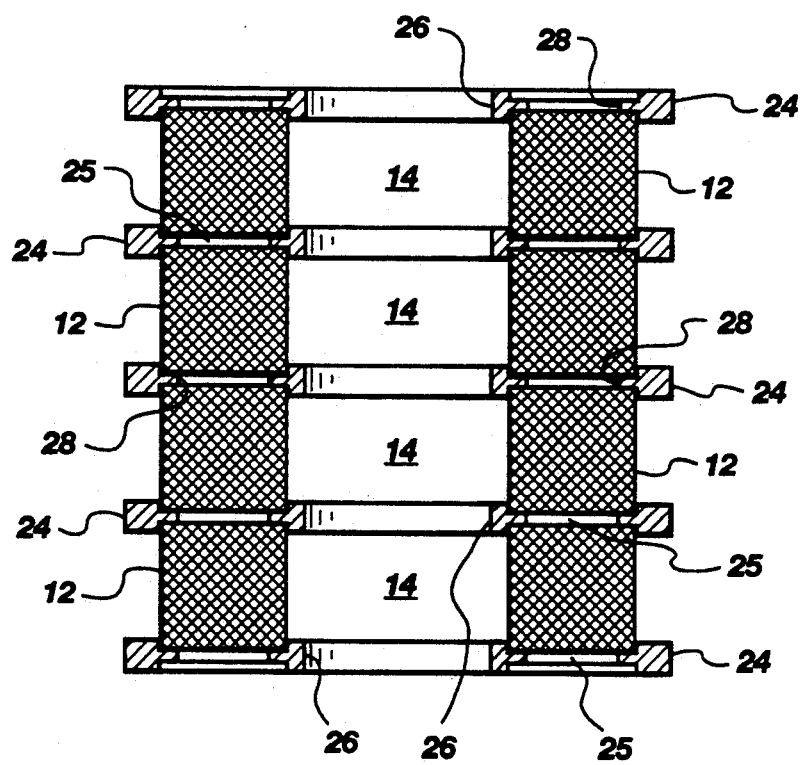
FIG. 7 is an elevation view of the section B—B in FIG. 6, but including the top manifold plate.

With manifold plates 24A and 24B bonded to the stacks 12 and interior and exterior seals 30 and 32, a gas entering central plenum 14 through plenum aperture 26 may flow outward through the transverse gas flow passageways 20 of the stacks 12. Likewise, a gas entering through rectangular gas flow apertures 28 is confined to enter and flow through the longitudinal gas flow passageways 18. In the structure illustrated in FIG. 5, the central plenum 14 is extended through all of the modules, and is in fluid communication with the transverse gas flow passageways 20 in the stacks 12 in each module. Likewise, a continuous fluid pathway is formed through the rectangular gas flow apertures 28 and longitudinal gas flow passageways 18 of the stacks of the modules arranged one above the other. The continuous fluid pathways are best illustrated in FIG. 7.

The stacked modular arrangement illustrated in FIG. 5 offers several significant advantages. As previously discussed, conduction of ions through the electrolyte elements is driven by the difference in the partial pressure of the uncharged species which exists on opposite sides of the element. Because the partial pressure difference decreases as the ionic species is consumed, the chemical potential of the reaction decreases the further the gases flow along the length of the electrolyte element. Similarly, as the reaction proceeds, the partial pressure of the reactants consumed on the opposite side of the electrolyte element decreases, which further reduces the efficiency of the reaction. As a result, a polarization occurs wherein the driving forces of the reaction are mitigated from consumption of reactants and production of end products. In the multi-tier embodiment illustrated in FIGS. 5 and 7, consumption of reactive gases occurs at the same rate in each module. Due to the flow characteristics provided by the central plenum, each module is supplied with fresh gases from the plenum. Reaction products do not accumulate tier after tier, and thus polarization is minimized.

A similar event occurs in the case of oxygen concentrators. As oxygen is conducted across the electrolyte elements, the difference in oxygen partial pressures on opposite sides of the elements first decreases and then begins to increase as pure oxygen accumulates on the product side of the element. This results in a "back emf" developing as the concentration of oxygen increases on the side of the element to which it must migrate. The tier arrangement minimizes "back emf" since pure oxygen may be collected from each tier simultaneously.

Minimizing polarization through the tier arrangement also provides for a smaller temperature differential between the tiers. Since less combustion occurs when the electrolyte element is polarized, less heat is produced from combustion. Temperature variations will thus occur along the flow path of the gases if polarization occurs.

In the illustrated electrolyte stack arrangements in FIGS. 1-7, each module contains electrolyte elements of optimal size to minimize the drop in reactant partial pressures along the length of the elements. "Back emf" and temperature variations are reduced along the length of the electrolyte elements, while the summation of the output from the tiers of modules is greater than if long electrolyte elements were used.

Performance may also be increased by filling the inter-tier spaces 25 with a material such as a nickel based catalyst which reforms reactant gases before they enter the gas flow passageways of the next module. Inter-tier reformation of the reactant gas serves to bring the gas back into equilibrium after a decrease in the partial pressure from consumption of reactants and production of reaction products.

In a preferred method of operation, a reactant gas such as air is introduced into the central plenum 14, and flows through the transverse gas flow passageways 20, while a different reactant gas such as $H_2$ or $CH_4$, is introduced through the rectangular gas flow apertures 28 into the longitudinal gas flow passageways 18. Several factors make the longitudinal gas flow passageways preferable for fuel. The seals between the rectangular gas flow apertures 28 in the manifold plates 24A and 24B and the fuel cell stacks 12 are much stronger and more efficient than the seals between the inner and outer primary seals 30 and 32 and the fuel cell stacks 12. A more efficient seal is desirable along the fuel gas pathway to ensure that the fuel gas is not allowed to mix with air. By contrast, the inner and outer seals 30 and 32 merely seal off the air pathway to ensure that the air is directed through the transverse gas flow passageways 20. This seal is not as efficient, but does not need to be so because it simply seals air inside the central plenum from air outside the central plenum. A modest amount of air leakage in the assembly of the invention is not deleterious to efficiency of the device.

If a leak in the fuel gas pathway is present, however, and air mixes with the fuel gas, the electrochemical reaction which normally occurs across the electrolyte elements occurs instead in the fuel gas stream. The products from the reaction are the same, but the electrons released from the reaction are not harnessed by the electrical components, and thus no electric current is generated from consumption of the fuel in this manner.

Another reason for the stated gas pathways is that the density of the fuel gas is generally less than that of air. In the instant invention, each stack receives air from the plenum, after which the air is not directed through another stack. This air flow arrangement provides a more balanced pressure drop relative to the multi-tier flow pattern of the fuel path.

Although the invention has been described with a certain degree of particularity in structure, reference herein to details of the illustrated embodiments has been made by way of example only, and numerous changes in structural details may be resorted to without departing from the scope of the following claims.

What is claimed is:

1. A module for an ion conducting device comprising:
   a plurality of solid state ion conducting electrolyte elements arranged into a plurality of stacks, successive said electrolyte elements in each of said stacks being positioned and arranged on edge in generally parallel relationship and spaced apart by a plurality of spacers, said stacks being arranged at regular intervals in a generally circular array around a central plenum having a plenum longitudinal axis;
   a plurality of longitudinal and transverse gas flow passageways in the spaces between said spaced apart electrolyte elements, wherein said longitudinal gas flow passageways are generally aligned with said plenum longitudinal axis, and said transverse gas flow passageways are generally transverse to, and radiating from said plenum longitudinal axis, said transverse gas flow passageways being in fluid communication with said central plenum;
   a plurality of seals disposed between adjacent stacks of ion conducting elements, said seals sealing the joints between adjacent stacks;
   a pair of manifold plates sealed against and sandwiching said stacks and said seals therebetween, said manifold plates having a plenum aperture therein in fluid communication with said plenum, and a plurality of gas flow apertures therein in fluid communication with said longitudinal gas flow passageways; and
   means for electrically connecting said stacks in electrical series or parallel.

2. The module for an ion conducting device in claim 1 including a plurality of said modules juxtaposed in a modular assembly wherein said plenum apertures of adjacent modules are generally aligned and in register, and said central plenum of adjacent modules are in fluid communication and form an extended central plenum axially oriented through said modular assembly, and said gas flow apertures of adjacent modules are generally aligned and in register, and said longitudinal gas flow passageways of each module are in fluid communication and form extended longitudinal gas flow passageways through said modular assembly, and said modules are electrically connected in electrical series or parallel.

3. The module for an ion conducting device in claim 1 wherein six said stacks of ion conducting electrolyte elements are arranged at regular intervals around said central plenum.

4. The module for an ion conducting device in claim 1 wherein four said stacks of ion conducting electrolyte elements are arranged at regular intervals around said central plenum.

5. The module for an ion conducting device in claim 1 wherein air is introduced into said plenum through said plenum aperture, and fuel gas is introduced into said longitudinal gas flow passageways through said gas flow apertures.

6. The module for an ion conducting device in claim 1 wherein said solid state electrolyte elements are polymeric electrolyte membranes.

7. The module for an ion conducting device in claim 1 wherein said solid state electrolyte elements are immobilized liquid or molten electrolyte membranes.

8. A modular tiered assembly for stacks of ion conducting electrolyte elements in an ion conducting device comprising:

a plurality of stackable tiers, each of said tiers comprising:
  a plurality of solid state ion conducting electrolyte elements arranged into a plurality of stacks whereby said elements in each of said stacks are positioned on edge, adjacent elements are arranged generally parallel, and are spaced apart by a plurality of spacers, said stacks being arranged at regular intervals in a generally circular array around a central plenum having a plenum longitudinal axis,
  a plurality of longitudinal and transverse gas flow passageways in the spaces between said spaced apart electrolyte elements, wherein said longitudinal gas flow passageways are generally aligned with said plenum longitudinal axis and extend through said tier, and said transverse gas flow passageways are generally transverse to, and radiating from said plenum longitudinal axis,
  a plurality of seals disposed between adjacent ion conducting stacks in each tier, said seals sealing the joints between adjacent stacks arranged around the perimeter of said central plenum;
  a plurality of manifold plates sealed against and sandwiching said ion conducting stacks and said seals in each tier therebetween, said manifold plates having a plenum aperture therein in fluid communication with said plenum, and a plurality of gas flow apertures therein in fluid communication with said longitudinal gas flow passageways, and
  means for electrically connecting said stacks in electrical series or parallel;
said tiers being juxtaposed in a stacked arrangement whereby said plenum apertures of adjacent tiers are generally aligned and in register, and said central plenum of adjacent tiers are in fluid communication and form an extended central plenum axially oriented through said modular tiered assembly, and said gas flow apertures of adjacent tiers are generally aligned and in register, and said longitudinal gas flow passageways of each tier are in fluid communication and form extended longitudinal gas flow passageways through said modular tiered assembly; and
means for electrically connecting said tiers in electrical series or parallel.

9. The modular tiered assembly for stacks of ion conducting electrolyte elements in claim 8 wherein each of said tiers includes six of said stacks of electrolyte elements arranged at regular intervals around said central plenum.

10. The modular tiered assembly for stacks of ion conducting electrolyte elements in claim 8 wherein each of said tiers includes four of said stacks of electrolyte elements arranged at regular intervals around said central plenum.

11. The modular tiered assembly for stacks of ion conducting electrolyte elements of claim 8 having means for introducing air into said extended central plenum through said plenum aperture in said manifold plates on a tier positioned at an end of said assembly, and having means for introducing a fuel gas into said extended longitudinal gas flow passageways through said gas flow apertures in said manifold plates on a tier positioned at an end of said assembly.

12. The modular tiered assembly for stacks of ion conducting electrolyte elements in claim 8 wherein said electrolyte elements are constructed from polymeric electrolyte membranes.

13. The modular tiered assembly for stacks of ion conducting electrolyte elements in claim 8 wherein said electrolyte elements are constructed from immobilized liquid or molten electrolyte membranes.

14. A module for a modular ion conducting device comprising:

a plurality of monolithic ion conducting electrolyte elements arranged into stacks whereby said electrolyte elements in said stacks are on edge, successive elements are positioned generally parallel and are spaced apart by a plurality of ridges on said elements, two or more of said stacks being arranged at regular intervals around a central plenum having a plenum longitudinal axis;
a plurality of gas flow passageways in the spaces between said spaced apart electrolyte elements, wherein a plurality of longitudinal gas flow passageways are generally aligned with said plenum longitudinal axis, and a plurality of transverse gas flow passageways are generally transverse to, and radiating from said plenum longitudinal axis, said transverse gas flow passageways being in fluid communication with said central plenum;
a plurality of seals disposed between adjacent stacks of electrolyte elements, said seals sealing the joints between adjacent stacks;
a pair of manifold plates sealed against and sandwiching said stacks and said seals therebetween, said manifold plates having a plenum aperture therein in fluid communication with said plenum, and a plurality of gas flow apertures therein in fluid communication with said longitudinal gas flow passageways; and
means for electrically connecting said stacks of electrolyte elements in electrical series or parallel.

15. The module for a modular ion conducting device of claim 14 wherein a plurality of said modules are arranged in a stacked modular assembly wherein said plenum apertures of adjacent modules are aligned and in register, and said central plenum of each module is in fluid communication and forms an extended central plenum, and said longitudinal gas flow passageways of each module are aligned in register form extended longitudinal gas flow passageways.

16. The module for a modular ion conducting device in claim 15 wherein air is introduced into said extended central plenum through said plenum aperture in a module positioned at an end of said modular assembly, and a fuel gas is introduced into said extended longitudinal gas flow passageways through said gas flow apertures in a module positioned at an end of said assembly.

17. The module for a modular ion conducting device in claim 14 wherein said ion conducting electrolyte elements are constructed from polymeric electrolyte membranes.

18. The module for a modular ion conducting device in claim 14 wherein said ion conducting electrolyte elements are constructed from immobilized liquid or molten electrolyte membranes.

19. A gas separation device and manifold configuration for preferential diffusion of a gaseous species comprising:

- a plurality of spaced apart gas separating membranes having specific pore sizes therein, said membranes arranged on edge into a plurality of stacks, said stacks arranged at regular intervals in a generally circular array around a central plenum having a plenum longitudinal axis, said circularly arranged membranes further arranged into stacked tiers wherein said central plenums of each of said tiers are in fluid communication and form an extended central plenum;
- a plurality of longitudinal and transverse gas flow passageways in the spaces between said spaced apart membranes, said longitudinal gas flow passageways of each tier being in register and generally aligned with said plenum longitudinal axis and forming extended longitudinal gas flow passageways through each of said tiers, and said transverse gas flow passageways generally transverse to, and radiating from said plenum longitudinal axis, said transverse gas flow passageways being in fluid communication with said central plenum;
- a plurality of seals disposed between adjacent stacks in each of said tiers, said seals sealing the joints between adjacent stacks;
- a plurality of manifold plates sealed against and sandwiching said stacks and said seals in each tier therebetween, said manifold plates having a plenum aperture therein in fluid communication with said plenum, and a plurality of gas flow apertures therein in fluid communication with said longitudinal gas flow passageways; and
- means for electrically connecting said stacks in electrical series or parallel, and means for electrically connecting said tiers in electrical series or parallel.

* * * * *